United States Patent [19]

Naquin et al.

[11] Patent Number: 5,678,924
[45] Date of Patent: Oct. 21, 1997

[54] POWER METER HEAD FOR LASER POWER MEASUREMENT APPARATUS

[75] Inventors: Robert R. Naquin, Loomis; Gerald L. Johnson, Fair Oaks; Mary M. Meek, Loomis; Eric S. Couzens, Auburn; William J. DeCosta, Sacramento, all of Calif.

[73] Assignee: Coherent Inc., Santa Clara, Calif.

[21] Appl. No.: 533,166

[22] Filed: Sep. 25, 1995

[51] Int. Cl.⁶ .............................. G01K 17/20; G01J 1/00; G01J 5/02
[52] U.S. Cl. .................. 374/32; 356/121; 250/342
[58] Field of Search .................. 374/6, 32, 179, 374/141, 29, 30; 33/293, DIG. 21; 356/121, 400; 250/338.1, 342

[56] References Cited

U.S. PATENT DOCUMENTS 3,596,514  8/1971  Meffered et al. .................. 73/190
4,964,735  10/1990  Sasnett et al. .................. 374/32

Primary Examiner—Richard Chilcot
Assistant Examiner—William L. Oen

[57] ABSTRACT

Apparatus for measuring laser power includes a target disc of a predetermined thickness located within, and in thermal contact with, a heat-sink. The heat-sink has an opening therein for directing laser radiation to be measured onto the target disc. A thermal gradient is established in the target disc when laser radiation to be measured is directed onto one surface of the disk. The opposite surface of the disc includes means for detecting the thermal gradient. The heat-sink includes a cylindrical core having an opening in one end thereof for admitting laser radiation to be measured. Cooling-vanes are disposed around the cylindrical core extending radially outward therefrom and extending therealong. A housing surrounding the heat sink includes a fan which causes air to be drawn into the housing, flow between the cooling-vanes, and the be expelled from the housing.

19 Claims, 7 Drawing Sheets

POWER METER HEAD FOR LASER POWER MEASUREMENT APPARATUS

TECHNICAL FIELD OF THE INVENTION

The present invention relates in general to laser power measuring apparatus. It relates in particular to laser power measuring apparatus wherein a target or radiation-receiver disc is located within a heat-sink, in thermal contact therewith, and laser radiation power is determined from a thermal gradient established in the target disc when laser radiation is incident on the target disc.

DISCUSSION OF BACKGROUND ART

A power meter using a power meter head of the type referred to above is disclosed in U.S. Pat. No. 3,596,514 (Meffered et al., Aug. 3, 1991), assigned to the assignee of the present invention, and the disclosure of which is hereby incorporated by reference. The power meter head has a heat-sink of generally spherical form. The heat-sink includes a central cylindrical core surrounded by a plurality of coaxially arranged, parallel, disc-shaped vanes of different radii. A radiation-receiver disc is located within the heat-sink in thermal contact therewith. The radiation-receiver disc includes an array of thermocouples arranged in two concentric circles which are concentric with the disc. When a thermal gradient is established in the disc by laser radiation incident thereon, the thermocouple array generates an electro-motive force (e.m.f) or voltage representative of the power of the incident laser radiation. The meter head can be calibrated and electronic apparatus provided to interpret the e.m.f. and display a result of the interpretation as laser power.

U.S. Pat. No. 4,964,735 (Sasnett et al., Oct. 23, 1990), also assigned to the assignee of the present invention, and the disclosure of which is also hereby incorporated by reference, discloses a variation of the above-discussed power meter head wherein target disc thermocouples are arranged in four sets of two concentric quadrants. When laser radiation is incident on this target disc four voltages (one from each quadrant) are provided and are interpreted to display where on the target disc laser radiation is incident. The four voltages may be summed to provide information about power of the laser radiation. Power is most accurately measured when radiation is incident centrally on the target disc. The laser power meter head is constructed in a similar manner to that disclosed by Meffered et al.

While the above-discussed and other improvements in laser radiation detection schemes have been made, it is believed that there has not been any effort made to improve heat-sink arrangements for commercially available laser power meter heads. Most commercially available laser power meters operate on principles discussed above and include a power meter head of the type discussed above.

One significant drawback of this type of power meter head is its size. By way of example, such a power meter head, effective for measuring continuous wave (CW) power up to 100 Watts (W), occupies a spherical volume of about 15 centimeters (cm) diameter. This size often causes such a power meter head to be difficult to fit into a laser apparatus for power measurement. Further, the form of such a power meter head makes it expensive to construct. Accordingly, such a power meter head is a significant contributor to the cost of laser power metering apparatus. There is clearly a need for an inexpensive laser power meter head having a heat-sink which is significantly smaller than above-discussed prior art heat-sinks but which is still capable of measuring relatively high CW laser power.

SUMMARY OF THE INVENTION

The present invention is directed to a laser power measuring apparatus including a power meter head having a more efficient heat-sink arrangement than heat-sink arrangements in prior art laser power meter heads. In one aspect of the present invention, a heat-sink includes a cylindrical core having an open end and an opposite, closed end, and having a central axis extending therethrough. The cylindrical core has a plurality of elongated cooling-vanes arranged therearound and extending outward therefrom. The core and the cooling-vanes are formed from a material having high thermal conductivity. Each of the cooling-vanes extends along the heat-sink core and is generally aligned with the central axis thereof.

A radiation-receiver disc having first and second opposite surfaces is located within said heat-sink core. The disc is arranged transverse to the central axis of the core, with a peripheral portion of the radiation-receiver disc being secured to the core in thermal contact therewith. The first and second surfaces of the radiation-receiver disc face respectively the open and closed ends of the heat-sink core. When laser radiation to be measured is directed through the open end of the heat-sink core onto a central portion of the first surface of the radiation-receiver disc, a temperature gradient proportional to power of the laser radiation is established between the central portion and the peripheral portion of the radiation-receiver disc. The second surface of the radiation-receiver disc has means thereon for measuring the temperature gradient.

In a preferred embodiment of the present invention, a cylindrical housing surrounds the heat-sink. The housing has a fan located at one end thereof, and spaced-apart from the closed end of the heat-sink core. The housing is open at an opposite end thereof which is generally aligned with the open end of the heat-sink core. The fan is arranged to draw air continuously into the housing at one end thereof and expel the drawn-in air from the housing at an opposite end thereof, thereby causing the drawn-in air to flow between the cooling-vanes.

The heat-sink core preferably includes first and second cylindrical core-portions. These cylindrical core-portions are coaxially aligned in an end-to-end manner. Each of the core-portions has a plurality of elongated cooling-vanes arranged therearound. Each of the cooling-vanes extends along the core-portion and extends outward therefrom, and each of the core-portions and the cooling-vanes thereof are formed from a material having high thermal conductivity. The radiation-receiver disc is secured between the first and second core-portions of the heat-sink and in thermal contact therewith.

Preferably, cooling-vanes of the first core-portion of the heat-sink are rotationally misaligned with cooling-vanes of the second core-portion of the heat-sink. Because of this, when the heat-sink is surrounded by a cylindrical enclosure, including a fan, as discussed above, air forced between the cooling-vanes by the fan flows between the cooling-vanes in a turbulent manner. This significantly increases the cooling efficiency of the cooling-vanes and the effectiveness of the heat-sink. A laser power meter head in accordance with the present invention, constructed in accordance with this last described embodiment, can occupy less than one third the volume of a comparable prior art power meter head rated for the same maximum laser power.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DETAILED DESCRIPTION OF THE INVENTION

Figure 1:
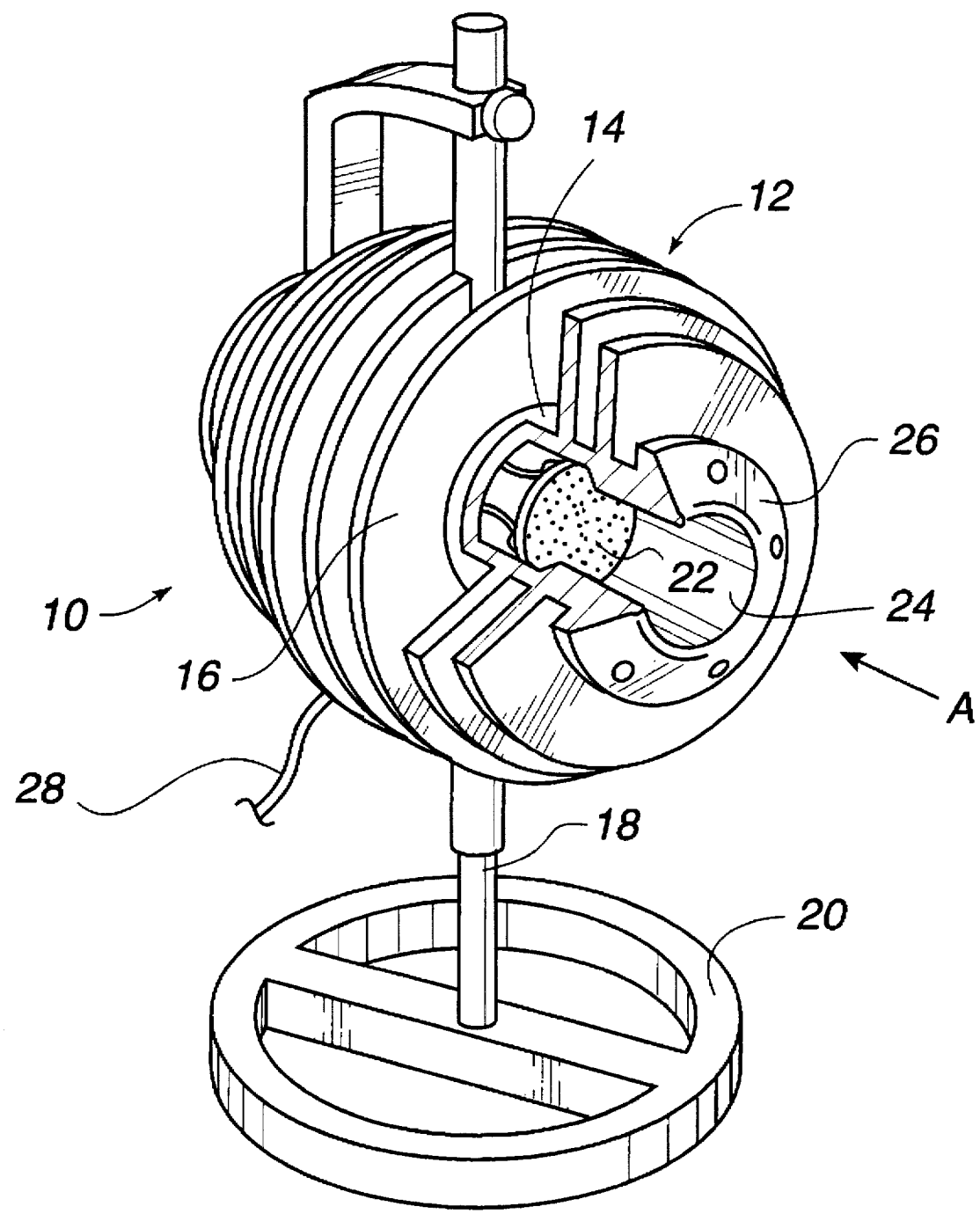
FIG. 1 is a perspective view schematically illustrating a prior art laser power meter head including a heat-sink occupying a generally spherical volume and formed from a central cylindrical core surrounded by a plurality of parallel, disc-shaped vanes of different radii.

Turning now to the drawings, wherein like components are designated by like reference numerals, FIG. 1 schematically illustrates a prior art power meter head 10 of the type discussed in above-referenced Meffered et al. And Sasnett et al. patents. The power meter head has a heat-sink 12 of generally spherical form. The heat-sink includes a central cylindrical core 14 surrounded by a plurality of coaxially arranged parallel disc-shaped vanes 16 of different radii. Power meter head 10 is adjustably attached to a supporting rod 18 which is mounted on a base 20.

A radiation-receiver or target disc 22 is mounted within heat-sink 12, in thermal contact therewith. Laser radiation to be measured (indicated by arrow A) is directed into power meter head 10 and onto target disc 22, via an aperture 24 defined by an aperture-defining member 26. Voltage signals from target disc 22 are transferred by a cable 28 to electronic processing apparatus (not shown).

As noted above, a power meter head 10 configured to measure sustained CW laser power up to a maximum of 100 W occupies a spherical volume of about 15 cm diameter. Base 20 and support rod 18 are appropriately scaled to provide stable support for the power meter head 10.

Figure 2:
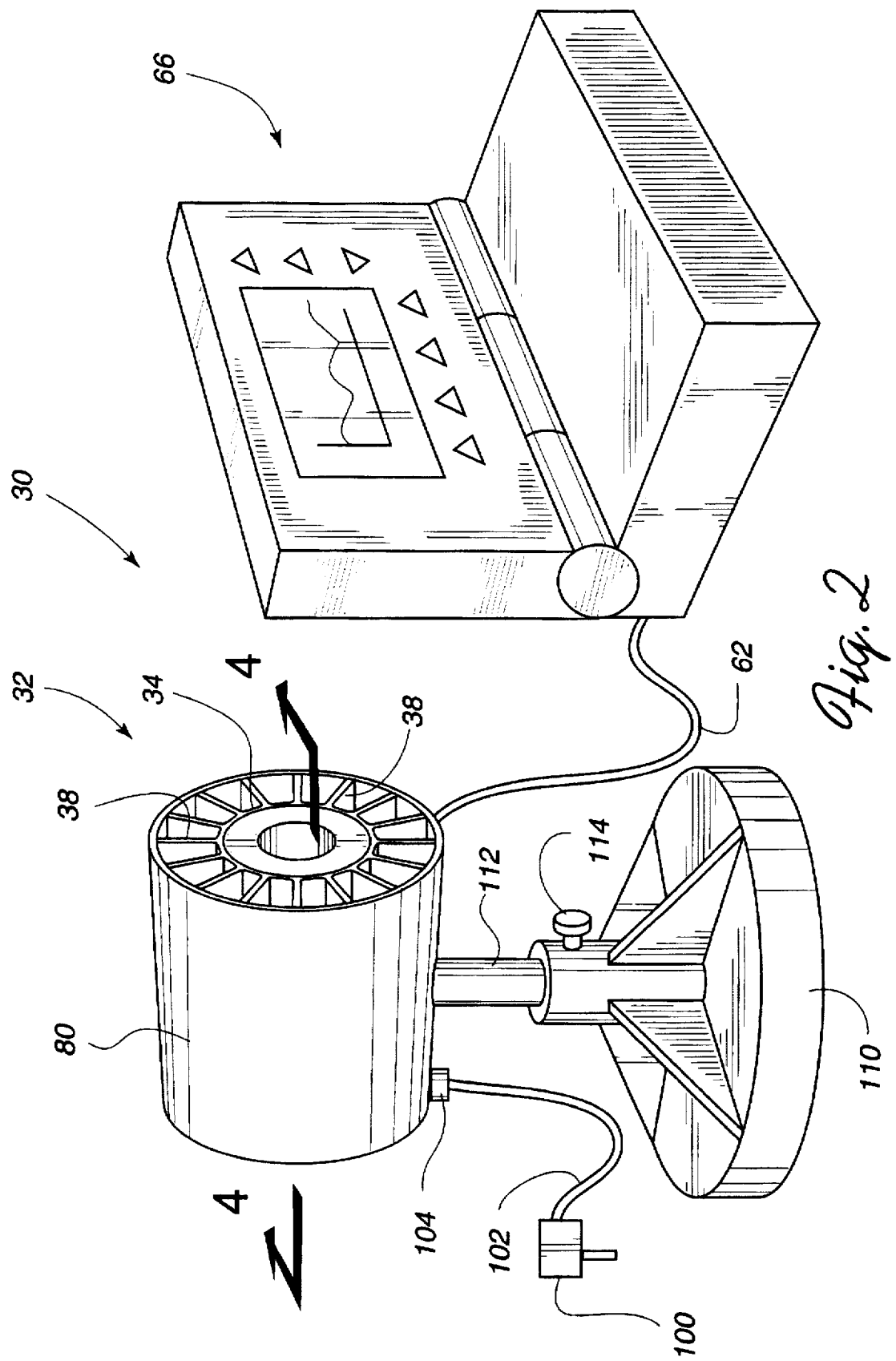
FIG. 2 is a perspective view schematically illustrating one embodiment of a laser power meter head in accordance with the present invention including a housing and, within the housing, a heat-sink occupying a generally cylindrical volume and formed from a central cylindrical core having elongated cooling-vanes arranged therearound, extending therealong, and extending radially outward therefrom.
Figure 3:
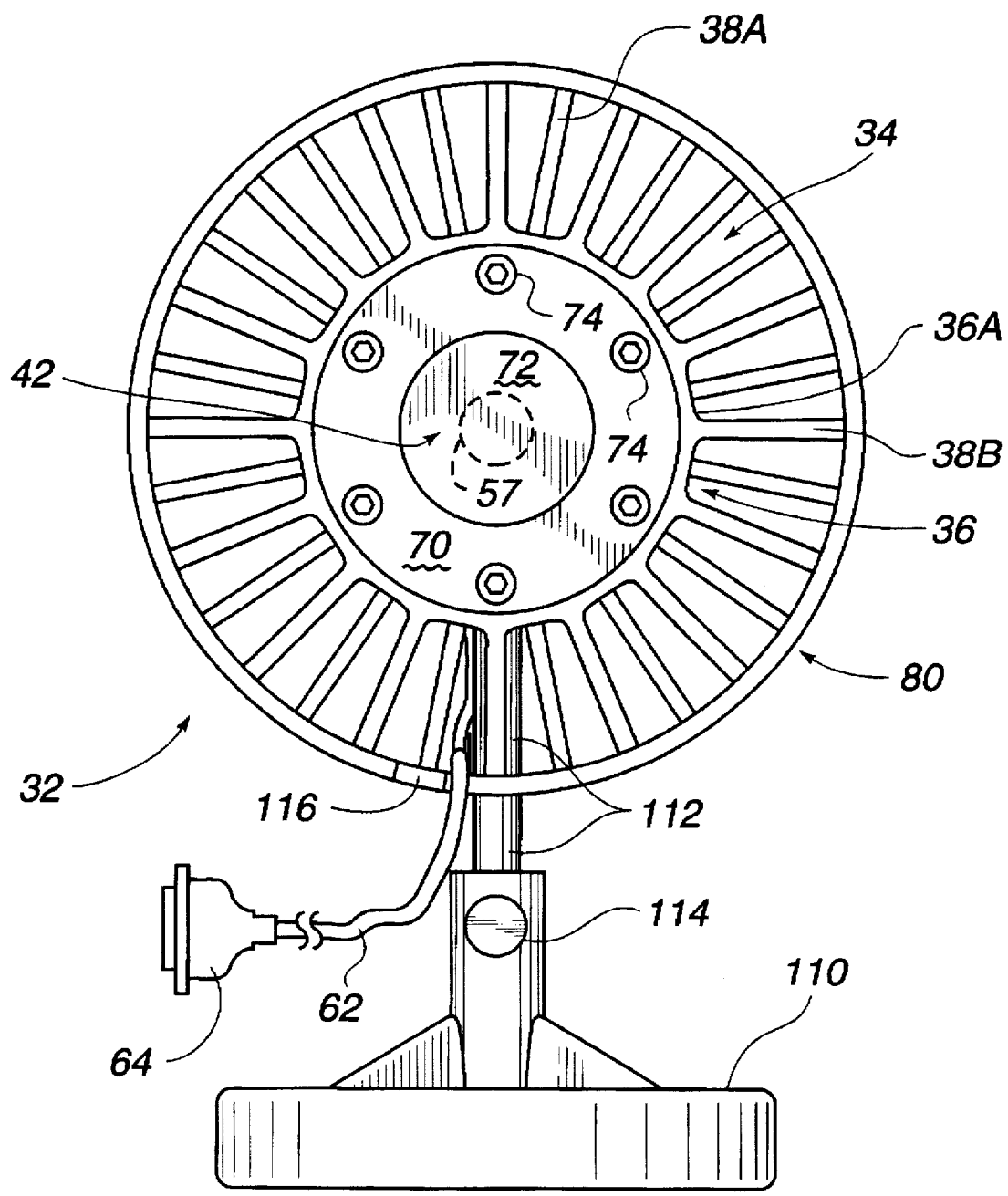
FIG. 3 is an end-elevation view schematically illustrating the laser power meter head of FIG. 2 including a heat-sink core having misaligned cooling-vanes for creating turbulent airflow between the cooling-vanes.
Figure 4:
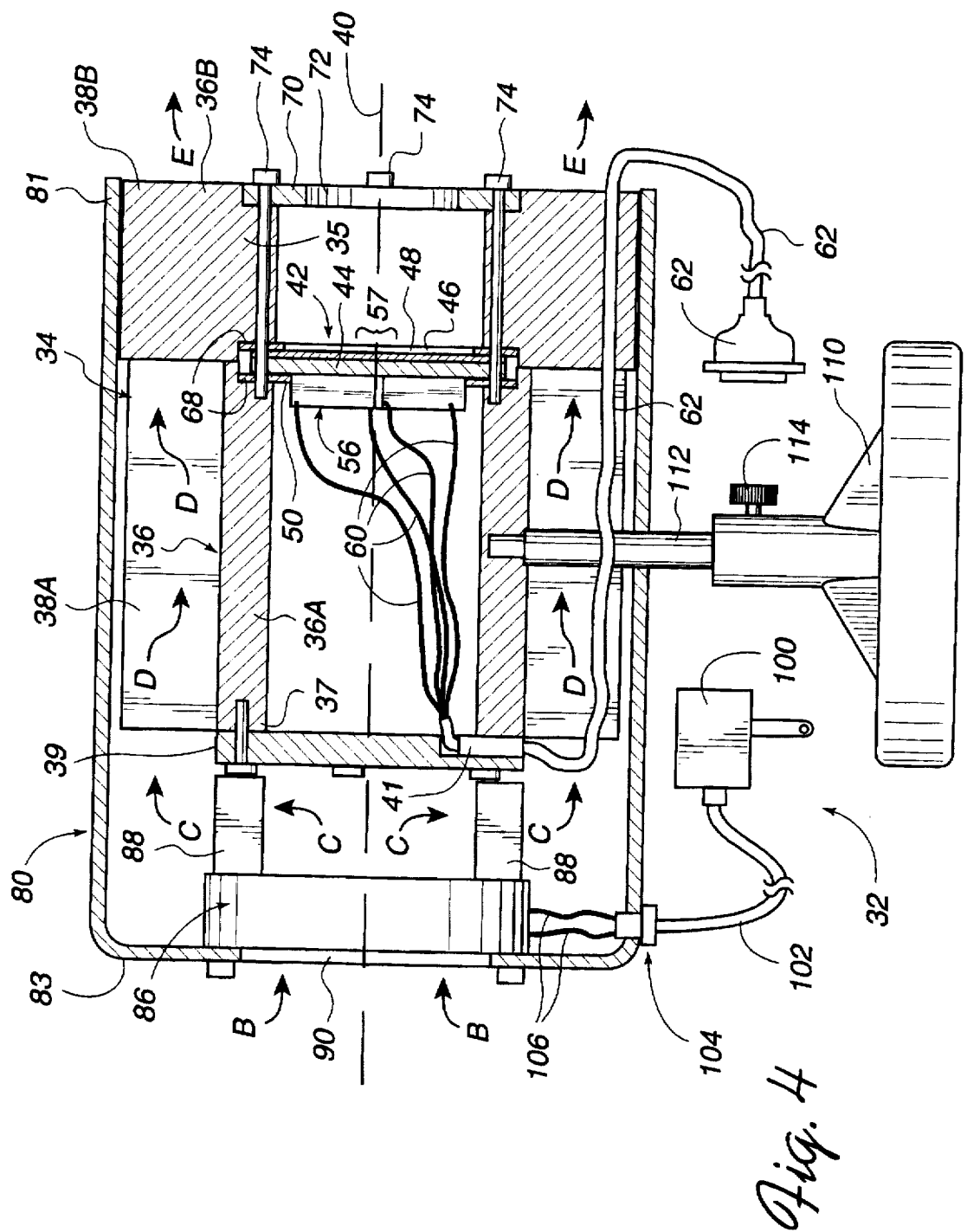
FIG. 4 is a longitudinal cross section view seen generally in the direction 4—4 of FIG. 2 schematically illustrating constructional details including a radiation-receiver disc.
Figure 5:
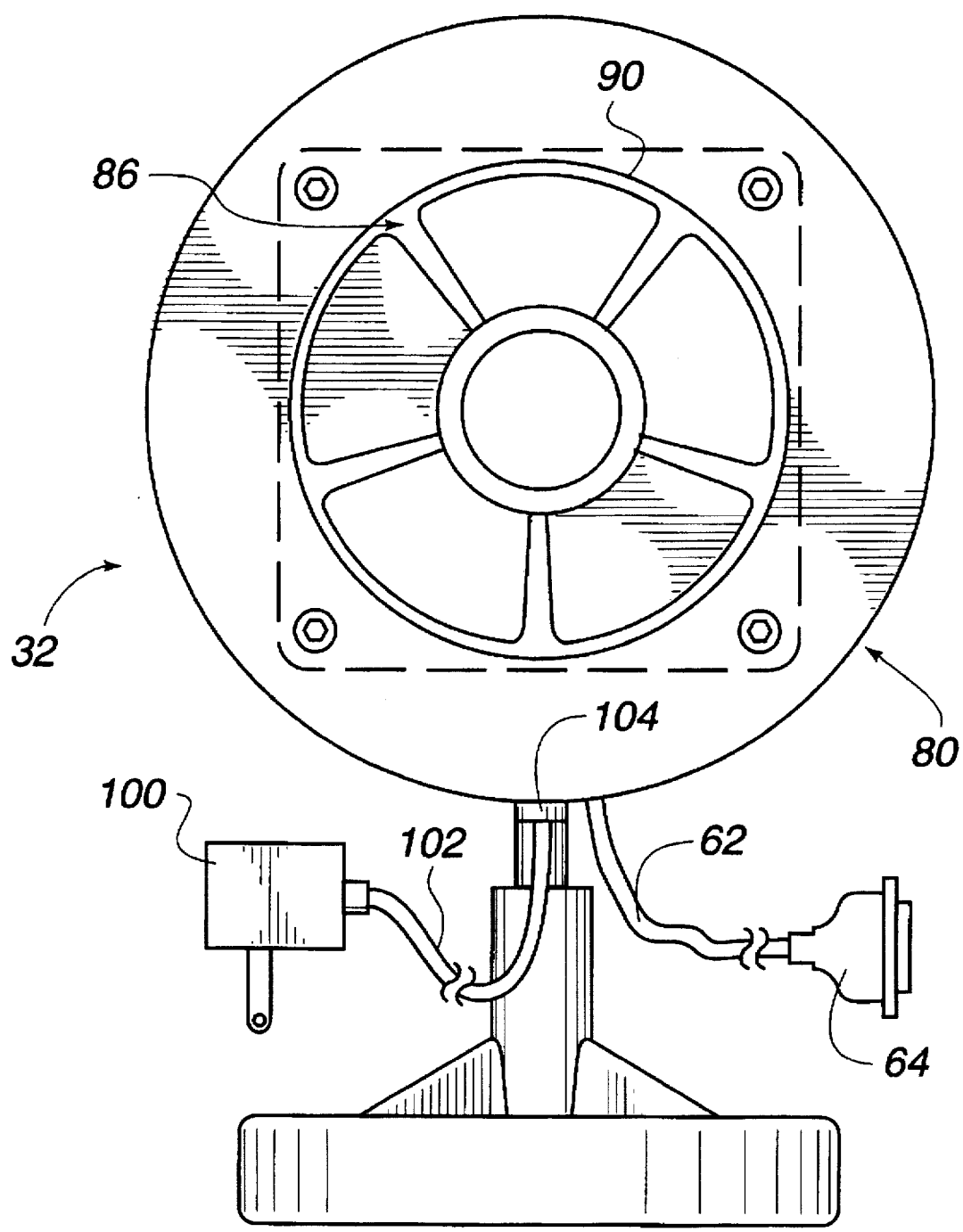
FIG. 5 is an end-elevation view schematically illustrating the laser power meter head of FIG. 2 including a fan for driving cooling air between the cooling-vanes of the heat-sink.

Turning now to FIG. 2 for a general view, and to FIGS. 3, 4, and 5 for details, one preferred embodiment 30 of laser power meter apparatus in accordance with the present invention is illustrated. Here a power meter head 32 is generally cylindrical in form. Power meter head 32 includes a heat-sink 34 which includes a cylindrical core 36. Extending along core 36 (see FIG. 4) and extending radially outward therefrom (see FIGS. 2 and 3) are generally rectangular, elongated cooling-vanes 38A and 38B. Core 36 is closed at one end 37 thereof by a plate 39. Preferably, cooling-vanes 38A and 38B each extend outward the same distance from core 36.

Core 36, plate 39, and cooling-vanes 38A and 38B are preferably formed from a material having a high thermal conductivity. For example, a metal such as iron, copper, aluminum, or molybdenum or an alloy of that metal is suitable. A particularly preferred material is a high thermal conductivity aluminum alloy designated Al 6063-T5. Core portions 36A and 36B and cooling-vanes thereon are preferably formed by extruding the aluminum alloy into an extrusion having an appropriate cross-section, and then cutting the core portions from that extrusion.

Core 36 includes two cylindrical core-portions 36A and 36B coaxially aligned in an end to end manner on central axis 40 of core 36. Cooling-vanes 38A on core-portion 36A and cooling-vanes 38B on core-portion 36B are rotationally misaligned (see FIG. 3) with each other for reasons which will be discussed further hereinafter. When core portions 36A and 36 B and cooling-vanes extending therefrom are formed from a single extrusion as discussed above, angular misalignment or offset of cooling-vanes in core-portion 36A with those of core-portion 36B is achieved by appropriate placement of screw holes for screws 74 (see FIG. 4) in the two core-portions.

Figure 6:
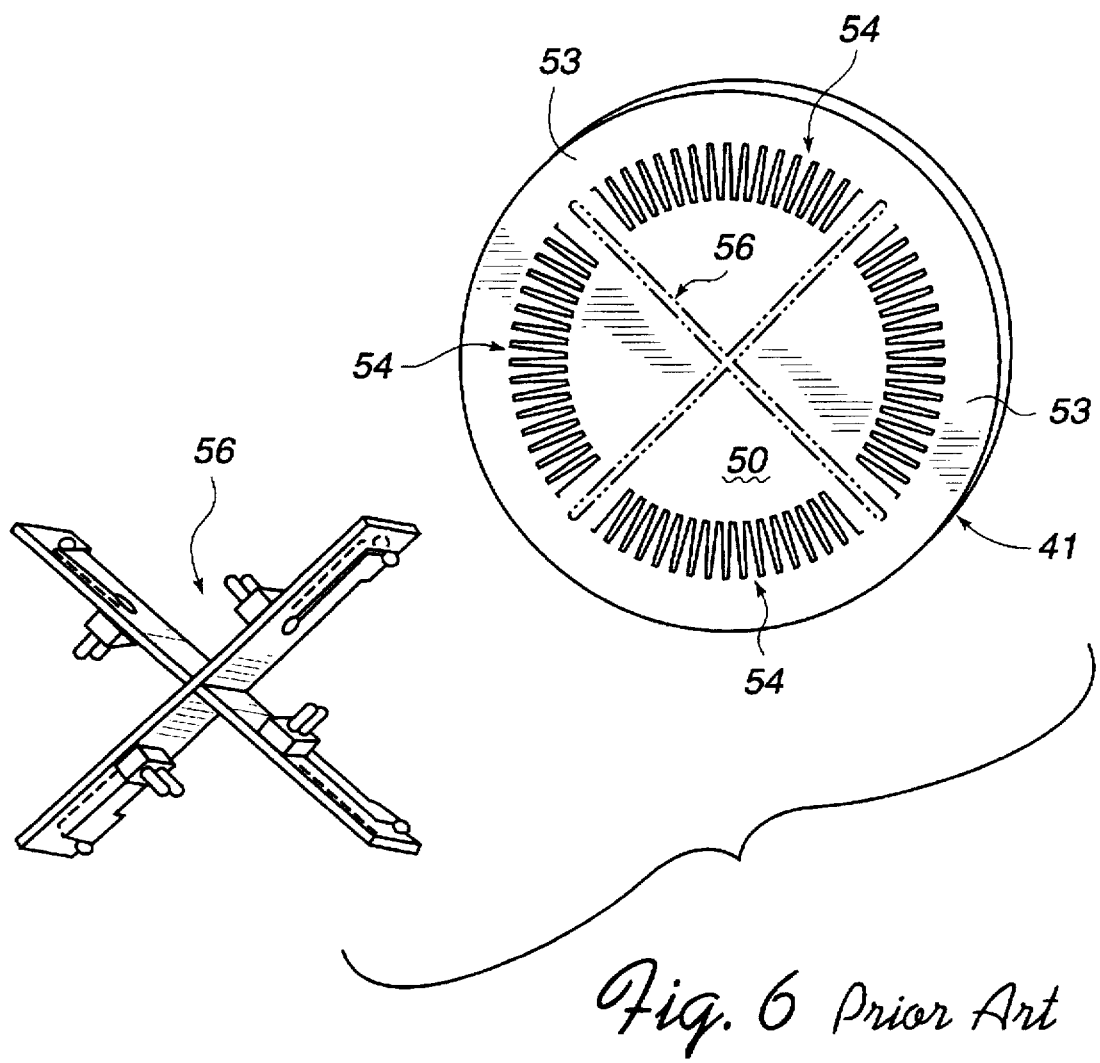
FIG. 6 is an exploded perspective view schematically illustrating four quadrant arrays of thermocouples assembled on a surface of the radiation-receiver disc of FIG. 3.

Continuing with reference to FIG. 4 and also to FIG. 6, located within heat-sink 34 is a radiation-receiver or target disc 42. Target disc 42 includes a metal substrate 44, preferably of aluminum, having a non-metallic coating 46, preferably chromium oxide, deposited on outward facing surface 48 of the substrate to protect the substrate from damage by incident laser radiation. Coating 46 preferably has a thickness between about 25.0 and 50.0 micrometers ($\mu$m).

On opposite surface 50 of substrate 44 are four quadrant-shaped arrays of thermocouples 54. Surface 50 is anodized to provide an oxide coating thereon. Thermocouple arrays 54 are preferably formed on anodized (oxide-coated) surface 50 by successive vacuum deposition of two dissimilar metals. A cross-shaped wiring member 56 is bonded onto anodized surface 50 and facilitates attachment of voltage-output leads 60 (see FIG. 4). Leads 60 are led via a flexible cable housing 62 to a twenty-five pin connector for connecting voltage output of thermocouple arrays 54 to readout or processing apparatus 66 (see FIG. 2). Cable housing 62 is clamped to core-portion 36A by plate 39 and a ferrule 41 to prevent straining thermocouple attachments at terminals 58.

Thermocouple arrays of the type exemplified by arrays 54, and methods of processing signals therefrom, are well known in the prior art. A detailed description of quadrant thermocouple arrays is provided in above-referenced U.S. Pat. No. 4,964,735. Accordingly, a detailed description of such thermocouple arrays and processing techniques is not presented herein.

Continuing now with reference to FIG. 4, target disc 42 is conveniently secured in core 36, in thermal contact therewith, by clamping a peripheral portion 53 of the disc between core-portions 36A and 36B. Preferably, peripheral portion 53 of disc 42 is clamped between two graphite washers 68, each thereof preferably having a thickness of about 254.0 µm. Such washers have been found to provide superior thermal conductivity and ease of assembly compared with soft metal seals used in prior art apparatus, and are capable of retaining mechanical integrity at much higher temperatures. Graphite material suitable for forming such washers is available from the Flexite Gasket Company of Dear Park, Tex.

Core 36 is open at end 35 thereof. An aperture plate 70 at end 35 defines an aperture 72 through which laser radiation to be measured is directed generally along axis 40 towards central portion 57 of target disc 42. Six elongated screws 74 are used to secure aperture plate 70 to core-portion 36B, and to clamp target disc 42 between core-portions 36A and 36B.

Continuing with reference in particular to FIGS. 3, 4, and 5, laser power meter head 32 includes a cylindrical housing 80. Housing 80 has an open end 81 generally aligned with open end 35 of core 36, and has a diameter selected such that it is a close fit around cooling-vanes 38A and 38B of heat-sink 34. This close fit is evident in particular in FIG. 3, wherein it can be seen that cooling-vanes 36B extend radially outward between core 36 and housing 80. At partially closed end 83 of housing 80, is attached a fan 86. Fan 86 is spaced apart from closed end 37 of core 36 by resilient stand-off members 88. One suitable fan 86 is a model KD1206HS2, available from the Teltec company of Minneapolis, Minn., which operates at about 12.0 V direct current (DC). Power for fan 86 is provided by an alternating current (AC) to DC converter via a cable 102, a two pin connector 104, and leads 106.

In a preferred mode of operation, fan 86 draws air into housing 80 via an aperture 90 in closed end 83 thereof (see FIG. 5) as indicated by arrows B (see FIG. 4). The drawn-in air is then forced radially outward by fan 86 within housing 80 (as indicated by arrows C in FIG. 4), between cooling-vanes 36A and 36 B (as indicated by arrows D in FIG. 4), and is expelled from the housing at open end 81 thereof (as indicated by arrows E in FIG. 4). Impediments to air flow created by end plate 39 of core 36 and by rotational misalignment between cooling-vanes 38A and 38B causes air flow between the cooling-vanes to occur in a turbulent manner. This greatly increases cooling efficiency of the flowing air.

Figure 7:
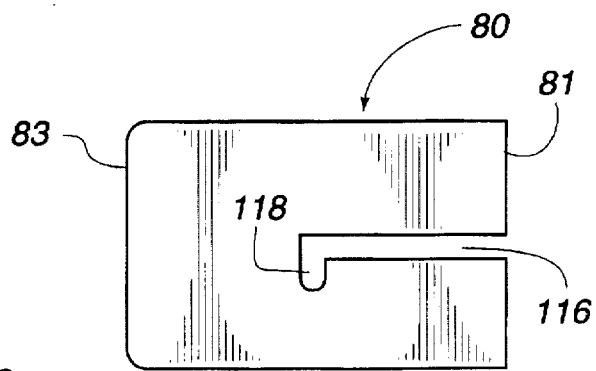
FIG. 7 is plan view from below schematically illustrating the housing of FIG. 4 including slots therein for attaching the housing to the heat-sink of FIG. 2.

Power meter head 32 is mounted on a base 110 via a support rod 112. Support rod 112 passes between cooling-vanes 36A and is screwed into core portion 36. Support rod 112 is secured in base 110 by a clamping screw 114. Referring to FIGS. 3 and 7, housing 80 is secured to heat-sink 34 by sliding the housing over the cooling-vanes, sliding longitudinal slot 116 over support rod 112, and rotating housing 80 to engage support rod 112 in circumferential slot 118 of housing 80.

The above-described heat-sink in accordance with the present invention has been found to be significantly more efficient in removing heat from a target or radiation receiving disc than heat-sink arrangements in prior art laser power measuring apparatus. By way of example, a driven-air cooled power meter head capable of measuring CW power up to 100 W, constructed generally as described above, requires a heat-sink having core diameters (inside and outside respectively) of about 4.1 cm and 5.0 cm; and having twenty-four equispaced cooling-vanes on each of core portions 36A and 36B, with a diameter of about 7.5 cm measured across cooling-vane tips, and with cooling-vanes of core-portions 36A and 36B rotationally misaligned by 7.5 degrees. Core-portions 36A and 36B, and cooling-vanes thereon, are preferably respectively about 4.8 cm and about 1.4 cm long. Housing 80 preferably has an overall length of about 12.0 cm. Such an apparatus occupies a volume less than about one-third of the volume occupied by above-described prior art apparatus of similar power measurement capability. Further, a correspondingly smaller support base is required for apparatus in accordance with the present invention than for prior art apparatus.

It is pointed out here that while driving turbulent air through cooling-vanes 36A and 36B significantly increases cooling efficiency of heat-sink 34. The elongated radially-extending cooling-vane arrangement alone provides for greater efficiency than above-described heat-sinks including parallel disc-shaped cooling-vanes. This is true even when cooling-vanes 38A and 38B are rotationally aligned with each other, such that pairs of aligned cooling-vanes function as a single cooling-vane.

By way of example, a power meter head having preferred core and vane dimensions as described above, but not including a housing and fan, can be used to measure CW laser radiation of about 30.0 W continuously and about 50.0 W intermittently.

Figure 8:
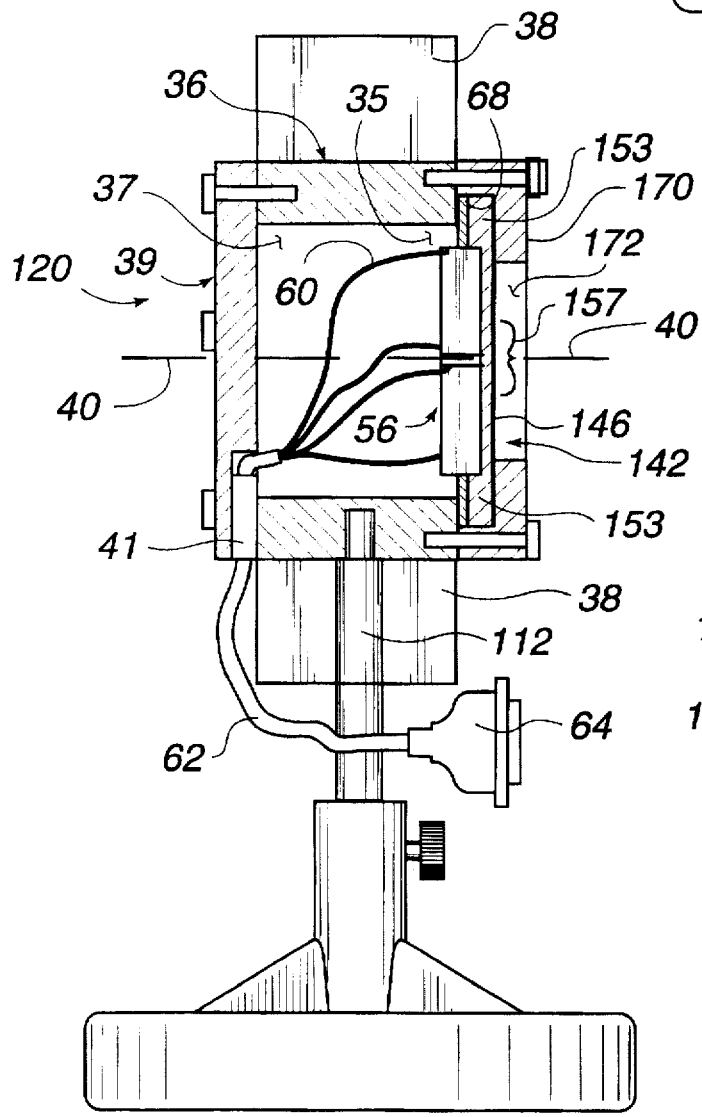
FIG. 8 is a longitudinal cross-section view schematically illustrating another embodiment of the present invention for measuring relatively low laser power and including a radiation-receiver disc specifically configured for low power measurement.
Figure 9:
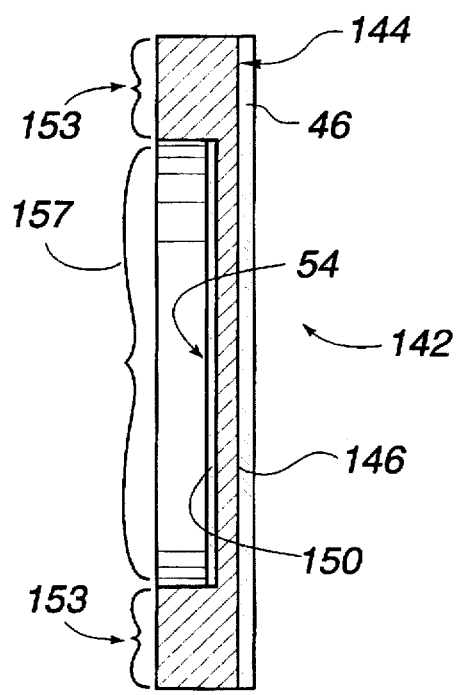
FIG. 9 is a diametrical cross-section of the radiation-receiver disc of FIG. 8.

Referring now to FIG. 8, a power meter head suitable for measuring power less than about 20.0 W to a level as low as about 10.0 milliwatts (mw) is illustrated. Here core 36 and longitudinal vanes 38 extending outward therefrom are preferably formed from a single portion of a Al 6063-T5 aluminum alloy. An recessed aperture plate 170 is used to secure a target or radiation-receiver disc 142, transverse to central axis 40 of core 36 and in thermal contact therewith via a graphite washer 68. Radiation-receiver-disc 142 differs from prior art target disc 42 discussed above in that is specially configured for sensitivity to low laser power, for example on the order of milliwatts (mW) of radiation. A detailed description of the disc is provided hereinafter. An aperture 172 in aperture plate 170 restricts incident laser radiation to a central portion 157 of radiation-receiver disc 142. In other constructional aspects, power meter head 120 is similar to power meter head 32 described above, accordingly, a further detailed description of power meter head is not repeated herein. Continuing now with reference to FIG. 9, a detailed discussion of Radiation-receiver disc 142 is set forth below.

Generally, the thinner a radiation-receiver disc, the more sensitive will be power measurement apparatus to low laser radiation power incident on the target disc. As it is also desirable that the disc be effective at high power, and, toward that end, desirable that it be coated with protective non-metallic coating, fabricating a target disc for low power measurements presents a significant problem.

Preferred deposition processes for non-metallic layer 46, particularly a most preferred process of flame spraying chromium oxide onto substrate 144 for providing layer 46, generate sufficient heat and stress that a substrate or disc, thin enough to provide desired low power sensitivity, would be buckled or otherwise unusably deformed by the deposition process. Radiation-receiver disc 142 is specifically configured to avoid such a problem.

Radiation-receiver disc is formed from a disc-shaped substrate 144 having a thickness greater than the desired thickness for a low-power sensitive disc. A substrate having a thickness of about 1.27 mm is preferred.

A central portion of the substrate is machined away, thereby forming disc shaped central portion 157 of the disc.

That portion of substrate 144 which is not machined forms a raised, annular peripheral portion 153 of disc 142, raised portion 153 having a thickness greater than central portion 157. For a heat-sink in accordance with the present invention core having above exemplified dimensions, peripheral portion 153 preferably has a thickness of about 1.27 mm, and central portion 157 preferably has a thickness of about 0.38 mm. Central portion 157 preferably has a diameter of about 2.8 cm. Disc 142 preferably has a diameter of about 4.1 cm. After central portion 157 of radiation-receiver disc 142 has been machined to the desired thickness, non-metallic layer 46 is then deposited onto surface 146 of central portion 157. Raised peripheral portion 153 provides sufficient support for central portion 157 of disk 142 that the disc is not deformed during non-metallic coating deposition. Opposite surface 150 of central portion 157 is preferably oxide-coated. Thermo-couple arrays 54 are deposited on the oxide-coated surface.

In summary, above-described prior art spherical heat-sinks including parallel disk cooling-vanes of different sizes are bulky and must be made by an expensive die casting process, lathe turning, or by welding discs individually to a cylindrical core. The expense of such manufacturing methods discourages providing a range of heat-sinks of different sizes for different power measurement tasks.

A heat-sink configuration in accordance with the present invention is not only more efficient than abovedescribed prior art heat-sink arrangements for laser power meter heads but is significantly smaller and less expensive to manufacture. The elongated, radially extending cooling-vane arrangement, with all cooling-vanes, generally rectangular, and extending about the same distance outward from the heat-sink core, provides, in particular, that both core sections 36A and 36B in power meter head 32 described above can be cut, as noted above, from a single extrusion of an extrudable metal such as aluminum. Further, a range of power meter heads having different laser power measurement capabilities can be fabricated from a single extrusion, by adjusting the length of core 36. For low power measurements, for example less than about 20.0 W, only a single portion of such an extrusion having an overall diameter of about 7.5 cm and a length of only about 2.0 cm is required.

The present invention has been described and depicted in terms of a preferred and other embodiments. The present invention is not restricted, however, to those embodiments described and depicted. Rather, the present invention is defined by the claims appended hereto.

What is claimed is:

1. Laser power measuring apparatus, comprising:

a heat-sink, said heat-sink including a cylindrical core, said cylindrical core having an open end and an opposite, closed end, and having a central axis extending therethrough;

said cylindrical core having a plurality of elongated cooling-vanes arranged therearound and extending outward therefrom, said core and said cooling-vanes formed from a material having high thermal conductivity, each of said cooling-vanes extending along said heat-sink core generally aligned with said central axis thereof; and a radiation-receiver disc having first and second opposite surfaces, said radiation-receiver disc arranged transverse to said central axis of said cylindrical core, with a peripheral portion of said radiation-receiver disc being secured to said heat-sink core in thermal contact therewith, said first and second surfaces of said receiver-disc facing respectively said open and closed ends of said heat-sink core, such that when laser radiation is directed through said open end of said heat-sink core onto a central portion of said first surface of said radiation-receiver disc, a temperature gradient proportional to power of said laser radiation is established between said central portion and said peripheral portion of said radiation-receiver disc, said second surface of said radiation-receiver disc having means thereon for measuring said temperature gradient.

2. The apparatus of claim 1 further including a cylindrical housing surrounding said heat-sink, said housing having a fan located at a first end thereof spaced apart from said closed-end of said heat-sink core, and open at an opposite second end thereof corresponding to said open-end of said heat-sink core, said fan arranged to draw air into the housing and expel said drawn-in air from said housing, thereby causing said drawn-in air to flow between said heat-sink vanes.

3. The apparatus of claim 2 wherein said fan is arranged to draw air into said housing at said first end thereof and expel said drawn-in air from said housing at said second end thereof.

4. The apparatus of claim 1 wherein said heat-sink core and cooling-vanes extending therefrom are formed from a single extrusion of said material having high thermal conductivity.

5. Laser power measuring apparatus, comprising:

a heat-sink, including a cylindrical core, said cylindrical core having an open end and an opposite, closed end, and having a central axis extending therethrough;

said heat-sink core including first and second cylindrical core-portions, said cylindrical core-portions coaxially aligned in an end-to end manner, each of said core-portions having a plurality of elongated cooling-vanes arranged therearound, each of said cooling-vanes extending along said core-portion and extending outward therefrom, and each of said core-portions and said cooling-vanes thereof being formed from a material having high thermal conductivity; and a radiation-receiver disc having first and second opposite surfaces, said radiation-receiver disc located within said heat-sink, and arranged transverse to said central axis thereof, with a peripheral portion of said radiation-receiver disc being secured between said first and second core-portions of said heat-sink and in thermal contact therewith, said first and second surfaces of said receiver-disc facing respectively said open and closed ends of said heat-sink core, such that when laser radiation is directed through said open end of said heat-sink core onto a central portion of said first surface of said radiation-receiver disc, a temperature gradient proportional to power of said laser radiation is established between said central portion and said peripheral portion of said radiation-receiver disc, said second surface of said radiation-receiver disc having means thereon for measuring said temperature gradient.

6. The apparatus of claim 5 further including a cylindrical housing surrounding said heat-sink, said housing having a fan located at a first end thereof spaced-apart from said closed-end of said heat-sink core, and open at an opposite second end thereof corresponding to said open-end of said heat-sink core, said fan arranged to draw air continuously into said housing and expel said drawn-in air from said housing, thereby causing said drawn-in air to flow between said heat-sink vanes.

7. The apparatus of claim 8 wherein said fan is arranged to draw air into said housing at said first end thereof and expel said drawn-in air from said housing at said second end thereof.

8. The apparatus of claim 7 wherein cooling-vanes of said first heat-sink core-portion are rotationally misaligned with cooling-vanes of said second heat-sink core-portion.

9. The apparatus of claim 1 wherein said heat-sink core-portions and cooling-vanes extending therefrom are each formed from an extrusion of said material having high thermal conductivity.

10. Laser power measuring apparatus, comprising:

a cylindrical housing, said housing having a fan located at a first end thereof and being open at a second end thereof;

a heat-sink, said heat-sink including a cylindrical core, said cylindrical core having an open end and an opposite, closed end, and having a central axis extending therethrough, said heat-sink coaxially located in said housing with said open end of said heat-sink core located at said open end of said housing and said closed end of said heat-sink core spaced apart from said fan;

said heat-sink core including first and second cylindrical core-portions, said cylindrical core-portions coaxially aligned in an end-to end manner, each of said core-portions having a plurality of elongated cooling-vanes arranged therearound, extending radially from said core-portion to said housing and extending along said core-portion, cooling-vanes of said first heat-sink core-portion being rotationally misaligned with cooling-vanes of said second heat-sink core-portion, and said core-portions and cooling-vanes thereof formed from a material having a high thermal conductivity;

a radiation-receiver disc having first and second opposite surfaces, said radiation-receiver disc located within said heat-sink, and arranged transverse to said central axis thereof, with a peripheral portion of said radiation-receiver disc being secured between said first and second core-portions of said heat-sink and in thermal contact therewith, said first and second surfaces of said receiver-disc facing respectively said open and closed ends of said heat-sink core, such that when laser radiation is directed through said open end of said heat-sink core onto a central portion of said first surface of said radiation-receiver disc, a temperature gradient proportional to power of said laser radiation is established between said central portion and said peripheral portion of said radiation-receiver disc, said second surface of said radiation-receiver disc having means thereon for measuring said temperature gradient; and said fan arranged to draw air continuously into the housing and cause said drawn-in air to be expelled from said housing, thereby causing said drawn-in air to flow between said heat-sink vanes.

11. The apparatus of claim 10 wherein said first and second core portions and cooling-vanes thereof are each formed from an extrusion of said material having high thermal conductivity.

12. In apparatus for measuring laser power, the apparatus including a target disc of a predetermined thickness in thermal contact with, a heat-sink, the heat-sink having an opening therein for directing laser radiation to be measured onto the target disc, the target disc having attached thereto means for detecting a thermal gradient in the target disc, said thermal gradient established when laser radiation to be measured is incident on the target disc, the invention characterized in that the target disc comprises:

a disc-shaped metal substrate, said substrate including a disc shaped central portion, said central portion having a first thickness and having a first surface and an opposite second surface, and said substrate having an annular peripheral portion having a second thickness, said second thickness greater than said first thickness;

said first surface of said central portion of said substrate arranged for receiving the incident laser radiation and having a non-metallic coating deposited thereon for protecting said first surface of said substrate from damage by the incident laser radiation; and said second surface of said central portion of said substrate having said thermal gradient detecting means attached thereto.

13. The invention as recited in claim 12, further characterized in that in step (b) the non-metallic coating is deposited by flame spraying.

14. The invention as recited in claim 13, further characterized in that the non-metallic coating is formed from chromium oxide.

15. In apparatus for measuring laser power, the apparatus including a target disc of a predetermined thickness located within, and in thermal contact with, a heat-sink, the heat-sink having an opening therein for directing laser radiation to be measured onto the target disc, a thermal gradient proportional to power of the laser radiation being established in the target disc when the laser radiation is directed thereon, and the target disc including means for detecting the thermal gradient, the invention characterized in that the heat-sink comprises:

a cylindrical core, said cylindrical core having an open end and an opposite, closed end, and having a central axis extending therethrough; and said cylindrical core having a plurality of elongated cooling-vanes arranged therearound and extending outward therefrom, said core and said cooling-vanes formed from a material having high thermal conductivity, each of said cooling-vanes extending along said heat-sink core generally aligned with said central axis thereof.

16. The apparatus as recited in claim 15, further characterized in that said heat-sink core is formed from first and second cylindrical core-portions, said cylindrical core-portions coaxially aligned in an end-to end manner, each of said core-portions having a plurality of elongated cooling-vanes arranged therearound, each of said cooling-vanes extending along said core-portion and extending outward therefrom, and each of said core-portions and said cooling-vanes thereof formed from said material having high thermal conductivity.

17. The apparatus as recited in claim 16 further characterized in that cooling-vanes of said first core portion are rotationally misaligned with cooling-vanes of said second core portion.

18. The apparatus as recited in claim 17 further characterized in that a cylindrical housing surrounding said heat-sink, said housing having a fan located at a first end thereof spaced-apart from said closed-end of said heat-sink core, and being open at an opposite, second end thereof corresponding to said open-end of said heat-sink core, said fan arranged to draw air continuously into the housing and expel said drawn-in air from the housing thereby causing said drawn-in air to flow between said heat-sink vanes.

19. The apparatus as recited in claim 18 said air is drawn in at said first end of said housing and said drawn-in air is expelled at said second end of said housing.

\* \* \* \* \*